United States Patent [19]
Gerin

[11] 3,898,871
[45] Aug. 12, 1975

[54] VISCOSITY COMPARATOR
[75] Inventor: Fernand L. Gerin, Red Bank, N.J.
[73] Assignee: The Gerin Corporation, Avon, N.J.
[22] Filed: June 10, 1974
[21] Appl. No.: 477,606

[52] U.S. Cl. .................................. 73/57; 73/57
[51] Int. Cl.² ................................. G01N 11/12
[58] Field of Search ............................ 73/57, 54

[56] References Cited
UNITED STATES PATENTS
2,703,489   3/1955   Gerin ........................ 73/57

Primary Examiner—Donald O. Woodiel
Assistant Examiner—Joseph W. Roskos
Attorney, Agent, or Firm—Parmelee, Miller, Welsh & Kratz

[57] ABSTRACT

A ball and rod release bar in a viscosity comparator is blocked from moving to ball and rod release position by a secondary bar which is restrained by a spring ball detent until sufficient pressure is applied to the release bar to also overcome the restraining effect of the spring ball detent, whereupon both the release bar and the secondary bar instantly move to the ball and rod release position to assure simultaneous release of all of the balls and rods in the instrument, but imposes no restraint on the return of the release bar to rod and ball holding position when pressure on said bar is released.

4 Claims, 5 Drawing Figures

VISCOSITY COMPARATOR

This invention is for an instrument intended for use in comparing the viscosity of one or more liquids with another or with a known standard and which has particular utility in an engine room or shop for the testing of lubricating oils for determining lubricity or loss of it due to dilution, or unwanted increase in viscosity because of sediment-forming substances. This is more fully explained in my U.S. Pat. No. 2,703,489 granted Mar. 8, 1955, for which this application is an improvement.

In my U.S. Pat. No. 2,703,489 the instrument comprises an upright supporting panel slightly inclined from a vertical plane. On the front of this panel at the bottom a plurality of tubes with open upper ends are arranged in side-by-side relation. Near the top of the panel there is a housing member extending crosswise of the panel. There are a plurality of wire rods passing through this housing, one for each tube. On the lower end of each rod there is fixed a ball or spherical weight, one of these being arranged to fall by gravity from an elevated position at the top of each tube to the bottom. For raising each ball from its lowermost position to its elevated position each rod, accessible above the top of the housing, may be lifted, there being a stop on each rod so that all of them can be lifted to exactly the same level. In the housing there is one torsion spring for each rod. One end or arm of this spring in each case normally contacts its rod to frictionally press it against the housing to hold the rod and its ball in elevated position. A trigger for releasing all the rods at one time comprises an operating bar having spaced pins therealong. The aforesaid ends of the several springs extend also into a position to be contacted or contact one of said pins. This operating bar has a push-knob at one end, the arrangement being such that when the knob is pushed toward a release position there is first a slight free movement, but on continued movement of the rod in the same direction, the spring ends of all of the torsion springs will be flexed by contact with the respective spaced pins clear of the respective wire rods which they engage, allowing the balls to drop through the liquids in the respective tubes. Upon release of pressure on the knob, the flexed spring ends, contacting the several pins, return the release bar and simultaneously engage the several rods to instantly check further descent of the balls and "freeze" them at the level reached in that instant. If there is a standard liquid in one tube, the falling of one ball faster than the ball in the tube with the standard will indicate that sample to be less viscous or more diluted than the standard, and if one ball falls slower than the one in the standard liquid, it will indicate that this liquid is more viscous or perhaps contains more gum-forming substances than the standard.

While this apparatus has been accepted and used extensively, there is a definite disadvantage in that if the operating or ball and rod release bar is not pushed fast enough the wire rods may not be simultaneously released, and this results in accurate measurements or possibly require repeat of the tests.

In addition to the ball and rod release bar there is a second bar positioned to normally obstruct the movement of said bar to ball-releasing position, preferably after some initial slight free movement. This second bar is restrained from free movement from the blocking position by a spring ball detent or like suddenly releasable restraining device until sufficient pressure is applied to the release bar to overcome the restraint of the detent and both bars will, because of this build-up of pressure, snap instantly to the full ball-releasing position, so that all of the balls and rods are simultaneously released. When, however, the operator removes his hand from the ball and rod release bar, that bar, unrestrained by the second bar, immediately, under the action of the several torsion springs, will be returned to a position where the several balls and rods are again held against further descent, unrestrained by the second bar which must be manually reset to its starting position. This also eliminates some of the variations resulting from the operation of the same instrument by different mechanics since each operator must apply the same minimum amount of pressure on the first bar to release the second bar.

My invention may be more fully explained in conjunction with the accompanying drawing showing a preferred embodiment thereof and in which.

Figure 1:
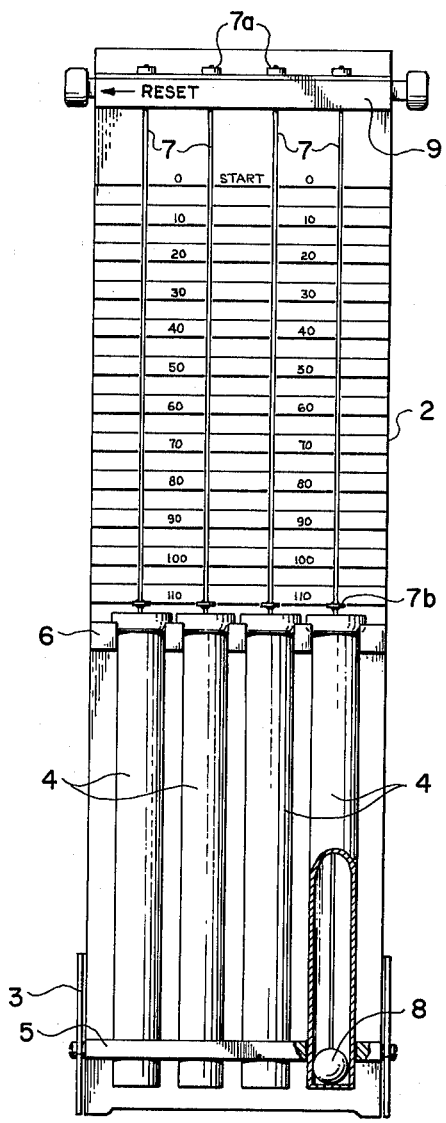
FIG. 1 is an elevation of the entire instrument.
Figure 2:
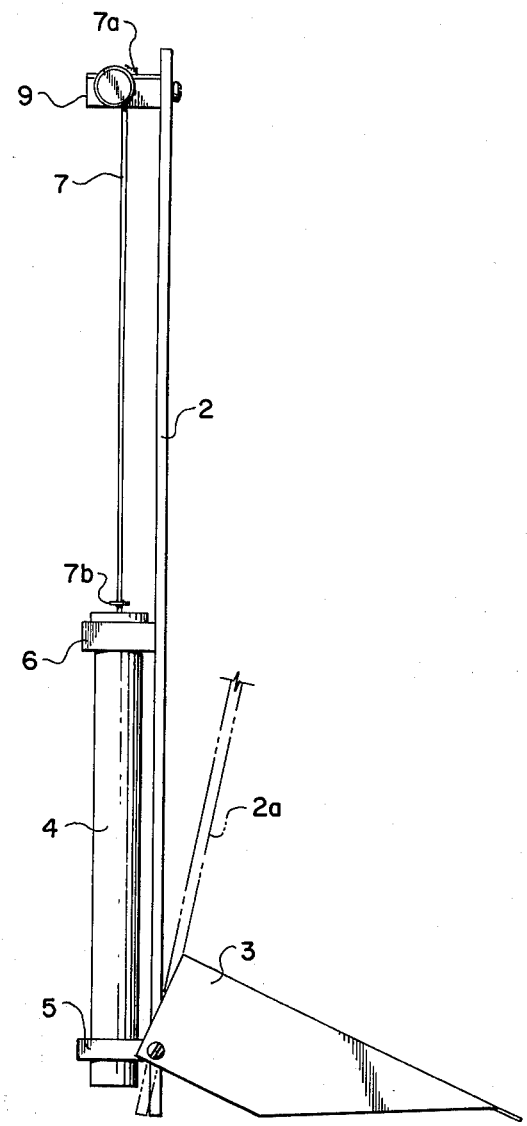
FIG. 2 is a side elevation of FIG. 1.

The instrument here shown is organized generally the same as the instrument disclosed in my earlier U.S. Pat. No. 2,703,489. There is an upright panel member 2 having a pivoted foot or easel member 3 secured thereto and arranged to swing from the position shown in FIG. 2 through an arc of around 270° to a position where it extends up over the front of the panel 2 when the instrument is packed for removal from one place to another. As here shown, and for the reasons explained in my earlier patent, it may incline rearwardly from the position shown in FIG. 2 to an angle tilted away from a vertical plane, as indicated by the phantom line 2a in FIG. 2.

As in my earlier patent there are a plurality of vertical sample-holding tubes 4 secured in an upright position, parallel with one another by a lower keeper 5 and an upper keeper 6. The tubes are readily removable from and replaceable in the keepers, and the slight inclination of the panel helps to keep them in place. The tubes 4 are all of the same length and their open tops are all at the same level.

There is a series of wire rods 7, one in axial alignment with each tube 4, each having a spherical weight or ball 8 at its lower end, all of the balls being of equal size and weight and preferably of a diameter such that each ball has only a slight working clearance in the tube 4 in which it is entered. Each rod 7 passes upwardly through a horizontally extending guide and control assembly 9, this assembly having a main body member 10 and a separate cover plate 11. The main body member 10 is here shown as comprising a rectangular metal block having end portions 12 and 13 and having a number of recesses or bays 14 extending horizontally from the back toward the front, there being solid metal portions 15 between each two recesses.

Each of the wire rods 7 passes upwardly through an opening 16 which comes through the body from the lower surface of the metal body 10 into one of the recesses 14, there being one recess for each rod. The cover plate 11 has an opening 16a for each rod 7, the openings 16a being in exact vertical alignment with the openings 16 below. The rods 7 project above the tops of the guide and control assembly, and each rod has a button or knob 7a at its upper end which prevents the rod with its attached ball from falling out of the instrument should the tube in which the ball is normally positioned happen to be removed. This knob also comprises a convenient enlargement to grip a rod and pull it upwardly.

Each rod 7 also has an indicator element 7b thereon that moves down the scale as the rod drops, and which, at the start of the test, is raised to the zero position by lifting the rod.

Figure 3:
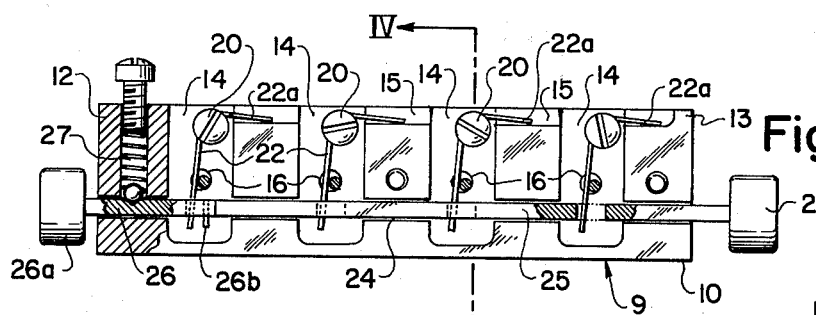
FIG. 3 is a top plan view of the rod-holding and release mechanism with the parts in position to be released but with the cover plate removed.
Figure 5:
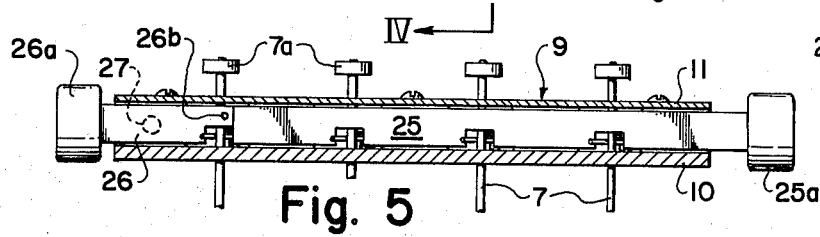
FIG. 5 is a longitudinal vertical section in the plane of line V—V of FIG. 4.
Figure 4:
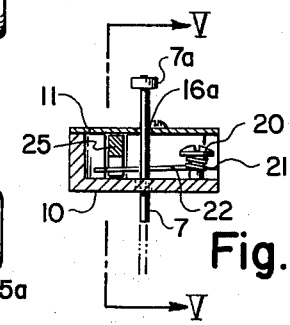
FIG. 4 is a transverse section in the plane of line IV—IV of FIG. 3 but with the cover plate in place.

As clearly seen in FIG. 3, there is at the rear of each recess a screw 20 about which is wrapped a torsion spring 21 having an arm 22 that presses against that rod 7 that passes up through the recess and frictionally holds it against the sides of the hole 16 through which the rod passes as the other arm 22a of the spring 21 presses against the solid metal portions 15, except that arm 22a of the endmost spring furthest to the right in FIG. 3 presses against end portion 13 of the block. By moving the several spring arms 22 to the left as viewed in FIG. 3, they move away from the respective rods 7 so that if, at that time, all of the balls 8 are raised to the upper limit of their travel near the tops of the tubes 4, they can drop, and the rate of their downward travel will depend on the viscosity of the liquid through which they descend.

So much of the structure as has now been described is generally similar to that shown in my said patent. In said patent there is shown a trigger rod or control rod with a push button at one end and having both ends slidable in the ends of the assembly. When the trigger or control rod as therein shown was moved to the left, the several spring arms corresponding to arms 22 herein were flexed to the left to release the respective wire rods against which they normally press to cause the balls to drop. If an operator was not careful or did not move the trigger rod fast enough, the several rods would not be simultaneously released so that one ball might start its descent relative to another. If this was observed the test had to be run again, or sometimes rerun more than once, and if it was not observed the result would not be accurate.

According to this invention there is a narrow channel 24 formed lengthwise of the block 10 from one end to the other, this channel being interrupted where it crosses a recess or bay 14. Instead of their being a single central rod as shown in said earlier patent, I now provide a main or ball and rod-release bar 25 and a separate secondary or short bar section 26. Both of these bars have a sliding fit in the channel 24 and the inner ends of the two bar sections are in confronting relation. The cover plate 11 keeps these bars in place. The main bar section 25 has a push button or knob 25a at its outer end, which as here shown is the right end. The shorter bar 26 has a similar knob 26a at its outer end. The main bar has notches 25b therein that set over the respective arms 22 of the torsion springs in the several recesses or bays 14 with clearance between the sides of these notches and the respective spring arms. At that recess 14 nearest the left, the bar 25 terminates at one side of the spring leg 22 (see FIG. 3). The shorter bar 26 also terminates in the same recess or bay as the main bar 25 but has a portion which is underduct that extends above the spring leg 22 in that recess, and which normally butts the end of this main bar. This undercut provides a notch-like opening between the two confronting bar section ends and is equal in width and purpose to the notches 25a in the main section. The right side walls of these notches correspond in purpose to the pins on the release bar as shown in my patent.

The end portion 12 of the body 10 has a resilient latching or holding means such as a spring-pressed ball detent unit 27 therein that presses into a recess in a side face of the short bar section 26, and more importantly restrains bar 26 against movement toward the left until it is pressed by bar 25 wth sufficient pressure to unseat or overcome the holding or latching effect of the ball detent. A pin 26b on the inner end of bar section 26 provides stop means to limit travel of the shorter section toward the left. A set screw is shown for adjusting the holding power of the ball detent.

In operation, when samples of liquid, as for example new oil and oil removed from an engine, with perhaps other samples of previous tests or samples having known percentages of diluents, sludge, or the like are placed in other tubes, the rods 7 and their spherical weights will have been pulled up until indicator elements 7b are all at the same or zero level. As the operator pushes the main release bar section 25 toward the left, as here shown, the right sides of the several notches will approach the spring arms 22, except in the recess to the far left when the end of bar 25 approaches the arm 22 of the spring in that bay, it will be in contact with the right end, that is the undercut inner end of the secondary bar 26. Beyond this point further movement of bar 25 toward the left will be resisted by the secondary bar 26 and its ball or like detent. Then the operator must supply sufficient pressure to overcome the holding effect of the detent. As the detent suddenly releases, the main bar 25, the secondary bar 26 and all of the spring arms 22 will move instantly to the left, and all of the rods 7 will be simultaneously released. Slow, easy pressure through the entire travel of the release bar, as in my earlier construction, is no longer possible and the release occurs for all practical purposes as an instantaneous snap of the rod and ball release bar to the release position.

When pressure is released by the operator from the main release bar section, the spring arms 22 acting against the end of this bar and the right sides of the notches move the bar 25 to the right, while they simultaneously move into frictional holding engagement with the wire rods, so that if the operator releases pressure against knob 25a at the instant the first weighted rod reaches bottom, the others will be caught and held in some mid-position to enable comparisons to be made. However, before the next test is made button 26a on the secondary bar section must be pushed to the right until the ball detent is again seated in the recess of the shorter bar 26, as indicated by the "Reset" mark on the upper left portion of the instrument. By having the main release bar 25 and a second restraining bar 26, the return movement of bar 25 toward the right is not retarded by the pressure of the spring detent and desirably the bar 26 is frictionally restrained by this pressure of the ball detent from free movement until it is manually reset.

I claim:

1. A viscosity comparator having a release bar which is pushed in one direction to flex a plurality of separate springs for the purpose of releasing a number of weighted rods so that they may drop by gravity and which bar, when released after being so pushed, is moved in the opposite direction by said springs returning to their original position, a second bar in the path of travel of the release bar arranged to be moved by the release bar when said release bar is pushed to flex said springs, and suddenly releasable restraining means for holding the second bar against movement by the release bar until pressure is applied to the release bar sufficient to effect the sudden release of said restraining means.

2. A viscosity comparator as defined in claim 1 wherein the restraining means for holding the second bar is a spring detent device.

3. A viscosity comparator as defined in claim 1 in which the restraining means is a spring pressed ball detent wherein the ball seats in a shallow recess in the second bar.

4. A viscosity comparator as defined in claim 1 in which the second bar has a means accessible for manually resetting the second bar to its original position after it has been moved by the operation of the release bar.

* * * * *